(12) United States Patent
McNary et al.

(10) Patent No.: US 6,729,488 B2
(45) Date of Patent: May 4, 2004

(54) TAMPER-INDICATING CLOSURE WITH RESILIENT LOCKING PROJECTIONS

(75) Inventors: Drew H. McNary, Lafayette, NJ (US); William D. Armstrong, Middlesex, NJ (US)

(73) Assignee: Captive Plastics, Inc., Piscataway, NJ (US)

( * ) Notice: Subject to any disclaimer, the term of this patent is extended or adjusted under 35 U.S.C. 154(b) by 115 days.

(21) Appl. No.: 09/971,470

(22) Filed: Oct. 5, 2001

(65) Prior Publication Data

US 2002/0027121 A1 Mar. 7, 2002

Related U.S. Application Data

(62) Division of application No. 09/656,597, filed on Sep. 7, 2000, now Pat. No. 6,355,201.

(51) Int. Cl.⁷ .............................................. B65D 41/34
(52) U.S. Cl. ................................................... 215/252
(58) Field of Search ......................................... 215/252

(56) References Cited

U.S. PATENT DOCUMENTS

| | | |
|---|---|---|
| 4,155,698 A | 5/1979 | Aichinger |
| 4,496,302 A | 1/1985 | Brown |
| 4,497,765 A | 2/1985 | Wilde et al. |

(List continued on next page.)

Primary Examiner—Nathan J. Newhouse (74) Attorney, Agent, or Firm—Caeser, Rivise, Bernstein, Cohen & Pokotilow, Ltd.

(57) ABSTRACT

A method for manufacturing a tamper-indicating closure having a plurality of resilient flexible projections bent upwardly and radially inwardly at a predetermined radius of curvature. The first step in the method includes providing a mold assembly comprising a female mold portion for forming the outer surface of the closure and a male mold portion for forming the closure's inner surface and its plurality of projections. The male and female mold portions are arranged for relative movement toward and away from each other between a mold open position and a mold closed position. When in the mold closed position, the male and female mold portions define a mold cavity in which the tamper-indicating closure is molded. The next steps in the method are to move the male and female mold portions into the mold closed position; to provide a mold material into the mold cavity; and, to maintained the mold portions in the mold closed position for a predetermined time period until the tamper-indicating closure is formed with its projections disposed at their predetermined radius of curvature. Next, the male mold portion is removed from the molded closure, whereby the projections temporarily bend from their predetermined radius of curvature to a second position. The closure includes a plurality of strain relief recesses corresponding to the number of projections, each strain relief recess being located radially outwardly from each projection. Each recess, in combination with the predetermined radius of curvature, acting to limit the extent of deformation of the corresponding projection during removal of the male mold portion so the projection can elastically return to substantially its "as molded" configuration.

6 Claims, 10 Drawing Sheets

U.S. PATENT DOCUMENTS

| | | |
|---|---|---|
| 4,506,795 A | 3/1985 | Herr |
| 4,511,053 A | 4/1985 | Brandes et al. |
| 4,552,328 A | 11/1985 | Dutt et al. |
| 4,564,112 A | 1/1986 | Breuer |
| 4,592,475 A | 6/1986 | Hannon et al. |
| 4,595,110 A | 6/1986 | Herr |
| 4,595,547 A | 6/1986 | Herr |
| 4,618,121 A | 10/1986 | Conti |
| 4,653,657 A | 3/1987 | Papavasilopoulos |
| 4,694,969 A | 9/1987 | Granat |
| 4,694,970 A | 9/1987 | Hayes |
| 4,721,218 A | 1/1988 | Gregory et al. |
| 4,748,735 A | 6/1988 | Hayes |
| 4,751,036 A | 6/1988 | Barriac |
| 4,759,456 A | 7/1988 | Kusz |
| 4,806,301 A | 2/1989 | Conti |
| 4,848,614 A | 7/1989 | Csaszar |
| 4,875,594 A | 10/1989 | Ochs |
| 4,978,016 A | 12/1990 | Hayes |
| 5,053,182 A | 10/1991 | Hedgewick |
| 5,058,755 A * | 10/1991 | Hayes ..................... 215/252 |
| 5,062,538 A | 11/1991 | Ochs |
| 5,086,938 A | 2/1992 | Aichinger |
| 5,145,078 A | 9/1992 | Hannon et al. |
| 5,167,335 A | 12/1992 | McBride et al. |
| 5,205,426 A | 4/1993 | McBride et al. |
| 5,219,507 A | 6/1993 | Ingram et al. |
| 5,230,856 A | 7/1993 | Schellenbach |
| 5,240,719 A | 8/1993 | Hedgewick |
| 5,281,385 A | 1/1994 | Julian |
| 5,368,469 A | 11/1994 | Ekkert |
| 5,370,520 A | 12/1994 | Ingram et al. |
| 5,383,780 A | 1/1995 | McCready et al. |
| 5,397,009 A | 3/1995 | Salmon et al. |
| 5,400,913 A * | 3/1995 | Kelly ..................... 215/252 |
| 5,450,973 A | 9/1995 | Ellis et al. |
| 5,462,184 A | 10/1995 | Ingram et al. |
| 5,488,888 A | 2/1996 | Kowal |
| 5,501,349 A | 3/1996 | McCandless |
| 5,564,582 A | 10/1996 | Kamath |
| 5,611,446 A | 3/1997 | Ingram et al. |
| 5,648,037 A | 7/1997 | Franch et al. |
| 5,667,087 A | 9/1997 | Delatour et al. |
| 5,690,882 A | 11/1997 | Sprowl |
| 5,725,115 A | 3/1998 | Bosl et al. |
| 5,727,705 A | 3/1998 | Kelly |
| 5,755,347 A | 5/1998 | Ingram |
| 5,813,553 A | 9/1998 | Herr et al. |
| 5,846,471 A | 12/1998 | Thakor et al. |
| 6,253,940 B1 * | 7/2001 | Graham et al. ............. 215/252 |

* cited by examiner

TAMPER-INDICATING CLOSURE WITH RESILIENT LOCKING PROJECTIONS

RELATED APPLICATION

This application is a Divisional of application Ser. No. 09/656,597, filed Sep. 7, 2000, now U.S. Pat. No. 6,355,201, entitled Tamper-Indicating Closure With Resilient Locking Projections, the disclosure of which is incorporated by reference herein.

BACKGROUND OF THE INVENTION

This present invention relates generally to a tamper-indicating closure and a method for manufacturing that closure. More particularly, the present invention relates to a tamper-indicating closure having a plurality of locking projections that are molded to extend from the tamper-indicating ring radially inwardly and upwardly at a predetermined radius of curvature. After molding, during removal of a male core portion from the molded closure, the projections temporarily bend downwardly from their predetermined radius of curvature. A strain relief recess, located radially outwardly from the locking projections, substantially reduces the extent of plastic deformation of the projections during removal of the male core portion. Thus, following removal of the male core portion, the projections elastically return to substantially their predetermined radius of curvature. Because the projections are able to elastically return, secondary heating and physical manipulation steps are eliminated.

It is important to provide tamper-indicating features on bottles and other containers. Increasingly, consumers have come to expect containers of all types that contain substances for human consumption to be equipped with tamper-indicating features. Although the use of such closures is widespread, the expense involved in producing such tamper-indicating closures has limited their use. If tamper-indicating closures could be manufactured less expensively than under current methods, they would be even more widely used.

One approach to providing a tamper-indicating closure is to provide an upper cap portion and a lower tamper-indicating ring which is detachably connected to the cap portion by a failure line. Under this approach, typically, constructions employ a plurality of resilient flexible projections or fingers which extend upwardly and radially inwardly from the lower tamper-indicating ring. Once the closure is applied to the container neck, these upwardly and inwardly directed projections move to engage an annular locking ring portion located on the container neck. When the closure is unscrewed from the neck of the container, the tamper-indicating ring becomes detached from the cap portion and remains on the container neck. Thus, when the cap portion is replaced on the container neck, an identifiable gap forms between the cap portion and the tamper-indicating ring which serves as a visual indication that the container has been previously opened.

Previous molding processes that have been used to manufacture thermoplastic tamper-indicating closures did not mold the projections in their final upward and radially inward positions. This is due to the fact that once the tamper-indicating closure is formed between female and male mold portions, it was necessary to remove the male mold portion from within the formed closure. If the projections were molded in their final upward and radially inward positions beneath the male mold portion, removal of the male mold portion from within the closure would cause these projections to bend severely and break off from the tamper-indicating ring. Instead, under these previous molding processes, closures were molded having projections that point straight down in an unbent fashion. In this manner, bending and breaking off of the projections during removal of the male mold portion was avoided. However, after removal of the male mold portion, post-forming operations became necessary to bend the projections upwardly to their final upward and radially inward positions. Due to the memory nature of thermoplastic materials, it was then necessary for the projections to be heated to re-set them from their straight down unbent configuration to their final upward and radially inward orientation. These post-forming steps increase manufacturing costs and cycle time. Additionally, these post-forming steps introduce unwanted variability into the manufacturing process. As a result, tamper-indicating closures manufactured utilizing these post-forming steps are costly and yield a product that is not sufficiently uniform in configuration.

Thakor et al. (U.S. Pat. No. 5,846,471) discloses a method and apparatus for manufacturing a tamper-indicating closure whereby the tamper-indicating projections are molded in their final position to extend radially inward and upward. Upon removal of the male mold portion from the closure, the plurality of projections must bend downwardly to a degree that is substantially parallel to the longitudinal axis of the apparatus. Such a degree of downward bending subjects the projections to significant deformation which prevents these projections from returning anywhere near their final orientation after removal of the male mold portion. Rather, under Thakor et al., after removal of the male mold portion, the projections bend inwardly to a position that is somewhere intermediate between straight down, unbent and their final molded orientation. Thus, after removal of the male mold portion, in order to return the projections to their final molded orientation, i.e., upward and radially inward, it is necessary to perform a secondary operation whereby the male mold portion is utilized to physically urge the downwardly bent projections to their originally molded position. Apparently, because the projections were molded in their final form rather than pointing straight down, no heating step is necessary to set the projections in their final orientation. Although Thakor et al., appears to be an improvement over the prior art molding processes discussed above because it apparently has eliminated a heating step, there still remains a post forming step which is required to urge the deformed projections to their originally molded orientation It is an object of the present invention to overcome these drawbacks and to provide a method for producing a tamper-indicating closure having resilient projections which elastically return substantially to their final position after removal of the male mold portion. The inventive closure requires no post forming operations such as physical manipulation or heating as discussed above.

OBJECTS OF THE INVENTION

Accordingly, it is a general object of this invention to provide a unitary tamper-indicating closure with resilient locking projections that overcomes the disadvantages of prior art.

It is a more specific object of this invention to provide a unitary tamper-indicating closure with resilient locking projections that has a high durability and long life span.

It is a more specific object of this invention to provide a unitary tamper-indicating closure with resilient locking projections that eliminates secondary heating and physical manipulation steps during the manufacturing process resulting in less manufacturing costs.

It is also a specific object of this invention to provide a unitary tamper-indicating closure with resilient locking projections which is simple in construction.

It is also a specific object of this invention to provide a unitary tamper-indicating closure with resilient locking projections which is reliable in operation and easy to use.

SUMMARY OF THE INVENTION

These and other objects of this invention are achieved by providing a method for manufacturing a tamper-indicating closure having a plurality of resilient flexible projections bent upwardly and radially inwardly at a predetermined radius of curvature. The first step in the method includes providing a mold assembly comprising a female mold portion for forming the outer surface of the closure and a male mold portion for forming the closure's inner surface and its plurality of projections. The male and female mold portions are arranged for relative movement toward and away from each other between a mold open position and a mold closed position. When in the mold closed position, the male and female mold portions define a mold cavity in which the tamper-indicating closure is molded. The next steps in the method are to move the male and female mold portions into the mold closed position; to provide a mold material into the mold cavity; and, to maintain the mold portions in the mold closed position for a predetermined time period until the tamper-indicating closure is formed with its projections disposed at their predetermined radius of curvature. Next, the male mold portion is removed from the molded closure, whereby the projections temporarily bend from their predetermined radius of curvature to a second position. The closure includes a plurality of strain relief recesses corresponding to the number of projections, each strain relief recess being located radially outwardly from each projection. Each recess, in combination with the radius of curvature, acting to limit the extent of permanent deformation of the corresponding projection during removal of the male mold portion so the projection can elastically return to substantially its "as molded" configuration.

In a variation of the disclosed embodiment, the male mold portion comprises an inner core member, a skirt member and an outer core member. The resilient flexible projections of the closure are formed between a molding surface disposed on the outer core member and a molding surface disposed on the skirt member. Prior to the step of removing the male mold portion from the molded tamper-indicating closure, the method further includes the step of separating the molding surface disposed on the outer core member from the bottom surface of the closure projections.

In another variation of the disclosed embodiment, following the step of separating the molding surface of the outer core member from the bottom surface of the closure projections, the method further includes the step of separating the female mold portion from the molded tamper-indicating closure.

In another variation of the disclosed embodiment, the inner surface of the closure includes an integrally molded internal screw thread arranged for engagement with an external screw thread disposed on the inner core member. The mold assembly includes a stripper ring arranged to be positioned against the closure to resist rotational movement of the closure during removal of the male mold portion. Under this variation, the step of removing the male mold portion from the closure includes the sub-step of rotating the inner core member while utilizing the stripper ring to maintain the closure non-rotational which causes the inner core member to unscrew from the closure.

In another variation of the disclosed embodiment, the mold assembly additionally comprises a knock-out bar arranged for movement between a retracted position to an extended position. Following the step of removing the male mold portion from the molded tamper-indicating closure, the method comprises the additional step of moving the knock-out bar from the retracted position to the extended position to eject the closure from the stripper ring.

DESCRIPTION OF THE DRAWINGS

Other objects and many attendant features of this invention will become readily appreciated as the same becomes better understood by reference to the following detailed description when considered in connection with the accompanying drawings wherein.

DETAILED DESCRIPTION OF THE PREFERRED EMBODIMENTS

Figure 1:
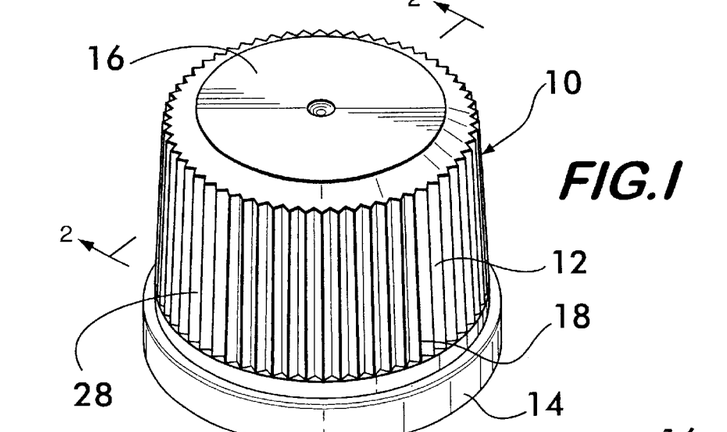
FIG. 1 is an isometric view of the tamper-indicating closure with resilient locking projections of the present invention.
Figure 2:
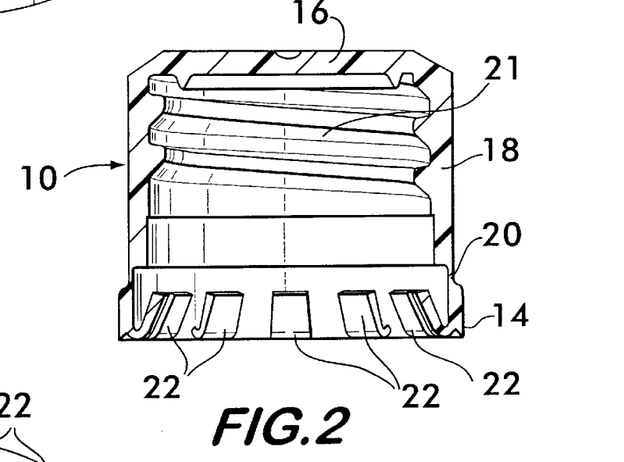
FIG. 2 is a sectional view taken through line 2—2 of FIG. 1.
Figure 3:
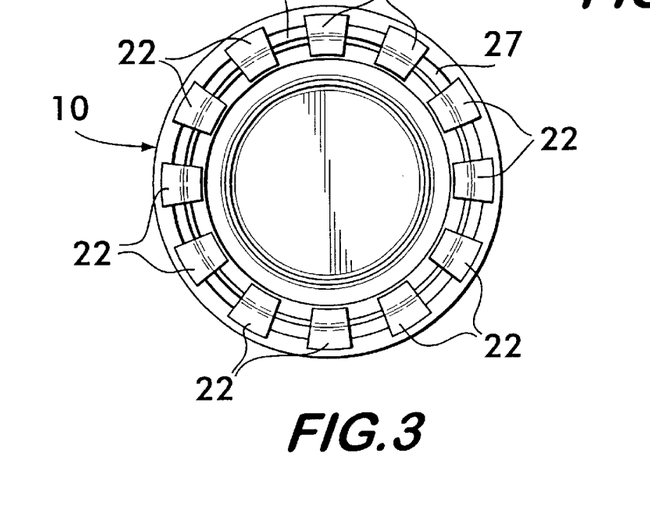
FIG. 3 is a bottom view of the tamper-indicating closure of the present invention.
Figure 4A:
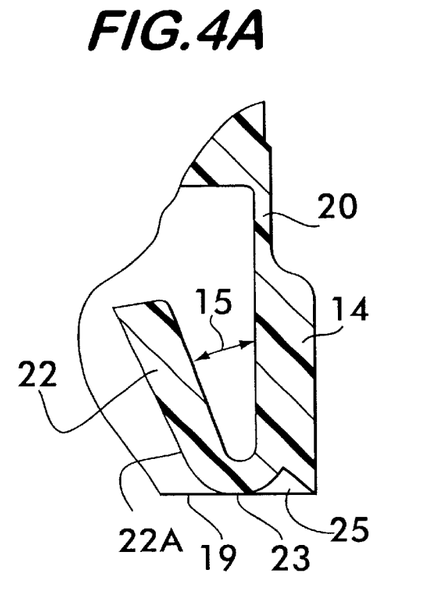
FIG. 4A is a sectional view a projection of the tamper-indicating closure, the projection shown in its upward and radially inward orientation after removal of the male mold portion.

Referring now to the various figures of the drawing wherein like reference characters refer to like parts, there is shown at 10 in FIGS. 1 through 3, a tamper-indicating closure having resilient locking projections that has been molded in accordance with the present invention. The closure of the present invention is intended for placement over and securement to a container having an externally threaded neck. The closure 10 includes an internally threaded upper cap portion 12 and a lower tamper-indicating band or ring 14 which is detachably connected to the cap portion 12 by a failure line or area of weakness. The cap portion 12 includes a top wall 16 for extending across the open top of a container and an annular skirt or sidewall 18 integrally joined to the top wall 16 about the periphery of the top wall and having a screw thread 21 (FIG. 2) formed on its inner surface for engagement with a threaded container neck (not shown). Together, the top wall 16 and the side wall 18 form the cap portion 12. As best shown in FIG. 4A, the tamper-indicating ring 14 is detachably connected to the lower periphery of the sidewall by breakable connector means 20. The breakable connector means 20 could be further weakened by the inclusion of series of generally rectangular perforations (not shown) cut into the breakable connector means 20 at evenly spaced intervals about the circumference thereof. When the cap portion 12 is unscrewed from the container neck (not shown), the tamper-indicating ring 14 is retained on the container neck by an annular container shoulder (not shown) and breaks away from the cap portion 12.

As best shown in FIGS. 2, 3 and 4A, a tamper-indicating closure 10 is provided with moveable, resilient projections 22 formed of any suitable thermoplastic material which lock against the lower surface of the annular container shoulder (not shown) to retain the tamper-indicating ring 14 on the container neck (not shown) as the cap portion 12 is removed. The preferred projections 22 are integral with the ring 14 and extend radially inward and upward from the generally cylindrical ring 14. As the cap portion 12 is removed, the upward force on the tamper-indicating ring 14 tends to bow the projections 22 inwardly against the annular container shoulder (not shown) and to stiffen the projections 22 to cause them to engage more tightly and to grip the container neck. The tamper-indicating ring 14 slides a short distance down the neck of the container after being broken away from the cap portion 12 so that after replacement of the cap on the container, there remains a readily discernible visual indication that the container has been opened.

Turning now to a more detailed description of a preferred embodiment of the closure 10 of the present invention, the cap portion 12 and tamper-indicating ring 14 herein are made of a moldable plastic material, such as polypropylene. As best seen in FIG. 1, the closure skirt or sidewall 18 has a generally cylindrical exterior with a plurality of equally spaced vertical ribs 28 formed to facilitate gripping of the cap.

As shown in FIG. 2, the tamper-indicating ring 14 is connected to the cap portion 12 by a breakable connector means 20 which is preferably located immediately below the lower end of closure sidewall 18. The breakable connector means 20 is a weakened area that provides a severing plane normal to the closure 10 central axis at which the tamper-indicating ring 14 will consistently detach from the cap portion 12 when the closure 10 is unscrewed. The breakable connector means 20 may be made in various manners. In other words, the breakable connector means 20, as illustrated in FIG. 2, could be constructed in a variety of other ways without departing from the scope of this invention. For instance, in accordance with the present invention, the breakable connector means 20 could be further weakened by the addition of a plurality of generally rectangular perforations (not shown) that are cut into the connector means 20 at evenly spaced intervals about the circumference thereof. These perforations could be added in a secondary operation following molding of the inventive closure 10. The perforations (not shown) could be of any suitable dimension, e.g., 0.125 inches in length, and may be separated from each other by any suitable distance, e.g., a 0.020 inch web disposed therebetween.

Referring now to FIG. 4A, there is shown therein a cross-sectional view of one of the projections 22 of the tamper-indicating closure 10 of the present invention molded in its final upward and radially inward orientation.

Turning now to a description of the method of the present invention, the closure 10 of the present invention is formed under the following method. FIGS. 5 through 8 and FIGS. 5A through 8A illustrate cross-sectional views of a molding apparatus 50 of the present invention for manufacturing a tamper-indicating closure 10 that is provided with a plurality of projections 22 extending radially upward and inward from a tamper-indicating ring 14 of the closure 10. Although for the sake of simplicity the present discussion focuses on the capability of the molding apparatus 50 to manufacture the tamper-indicating closure 10 shown in FIGS. 1 through 3, it is to be understood that the present invention has the ability of being modified to produce other types of tamper-indicating closures having projections that are to be formed in various configurations.

Figure 5:
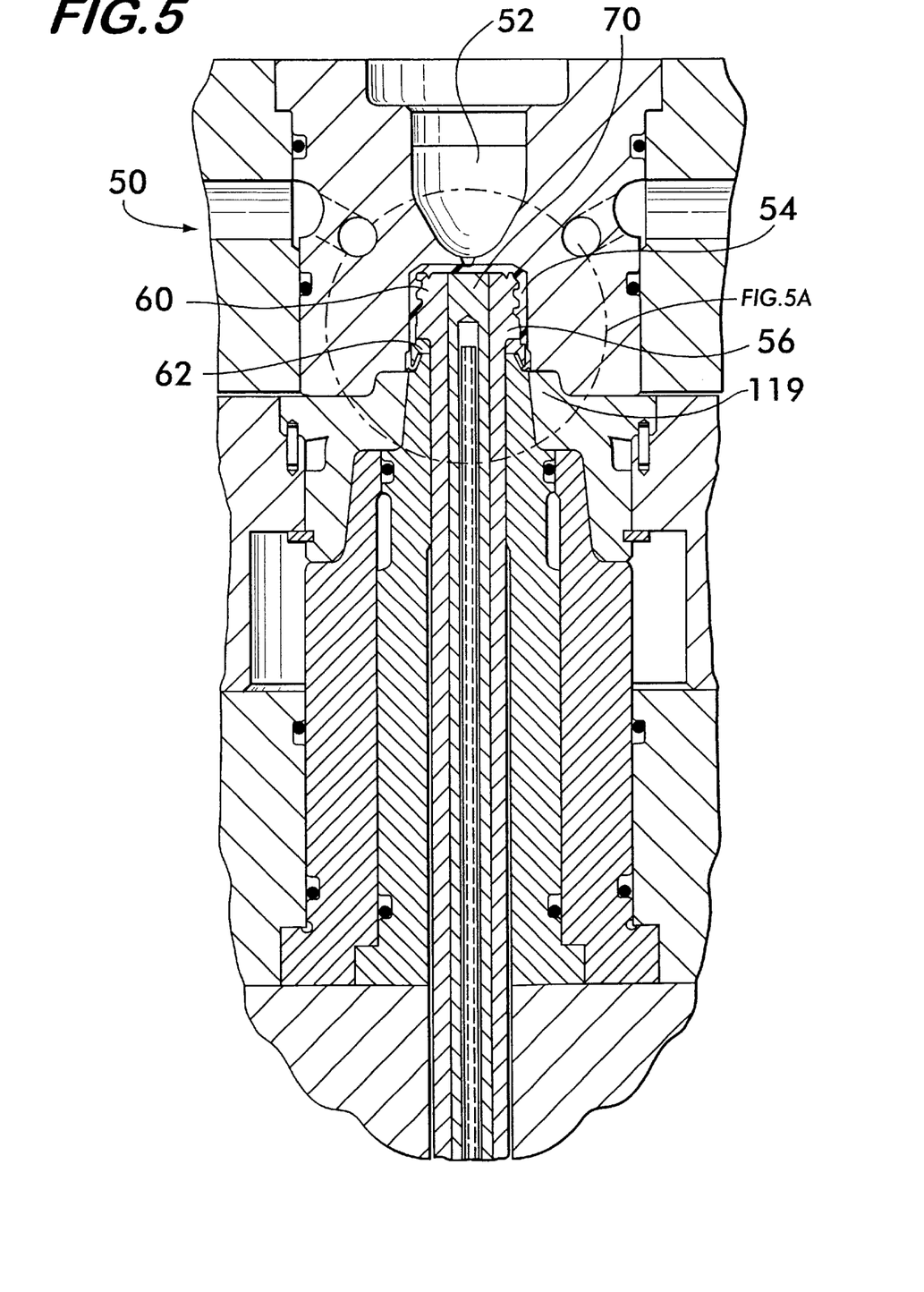
FIG. 5 is a cross-sectional view of the molding apparatus of the present invention shown in a closed position.
Figure 5A:
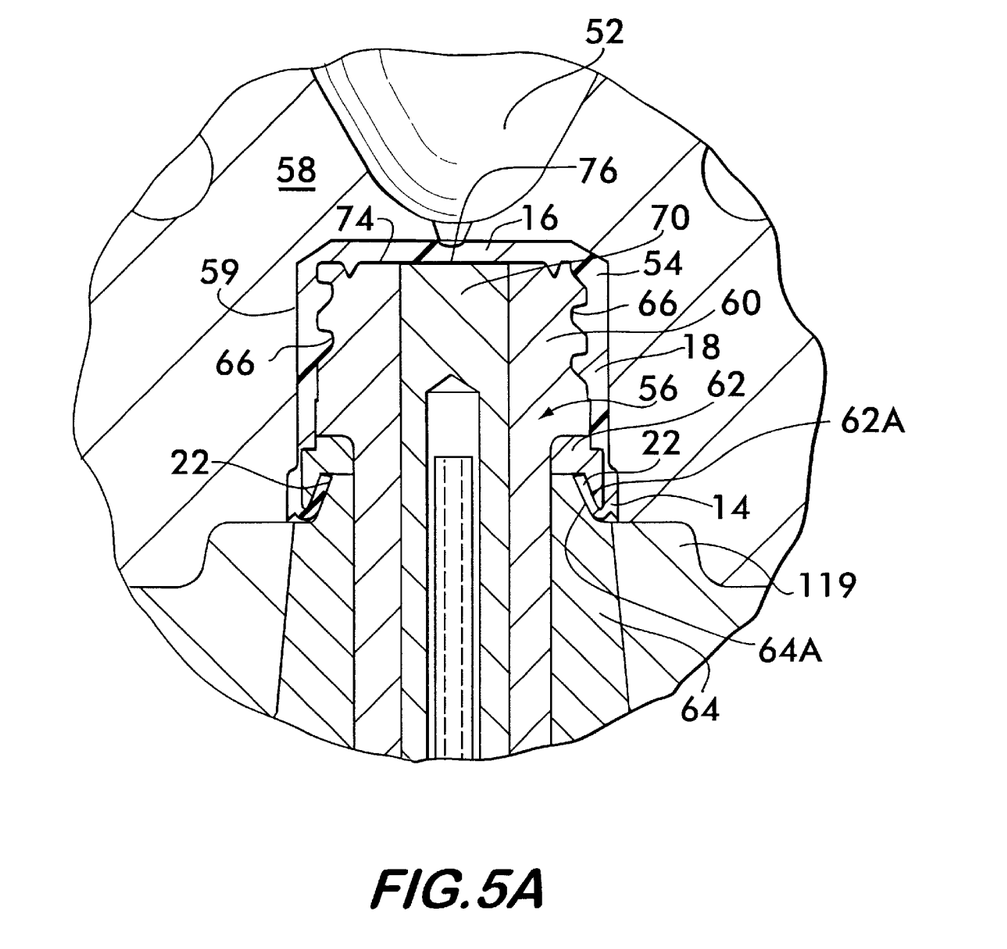
FIG. 5A is a detailed view of the area circled and labeled "FIG. 5A" in FIG. 5.

FIGS. 5 and 5A illustrate the molding apparatus 50 in the mold closed position, in which the apparatus 50 is configured to receive from an injection port 52 molten plastic material into a mold cavity 54, As shown in FIGS. 5 and 5A, the mold cavity is shown filled with plastic material forming the closure 10 of the present invention. Referring now to FIG. 5A, the mold cavity 54 is defined as the volume of space existing between the outer surface of a moveable male mold portion 56 and the inside surfaces of a female mold portion 58. The female mold portion 58 comprises an annular recess 59 (best shown in FIGS. 7 and 7A), the inner surface of which comprises a mold surface for forming the outer surface of the top wall 16, the outer surface of the annular sidewall 18 and the outer surface of the tamper-indicating ring 14 of the closure 10.

Referring again to FIG. 5A, the male mold portion 56 is referred to as moveable because, as shall be explained later, the male mold portion 56 may be moved along a longitudinal axis of the apparatus 50. The moveable male mold portion 56 comprises an inner core member 60, a skirt member 62 and an outer core member 64. The inner core member 60 has an externally threaded outer side surface 66, for forming the internal screw thread 21 (FIG. 2) formed on the inner surface of the sidewall 18 of the closure 10.

The skirt member 62 includes a bottom molding surface 62a and the outer core member 64 includes a top molding surface 64a. Together, these molding surfaces 62a and 64a define a portion of the mold cavity 54 therebetween in which the projections 22 of the closure 10 are formed in their final, radially upward and inward position. The angle of inclination of surfaces 62a and 64a can be configured to any desired inclination, and this angle of inclination corresponds to the degree to which the projections 22 extend radially upward and inward from the tamper-indicating ring 14 of the closure 10. In addition, the angle of inclination of surfaces 62a and 64a, relative to one another, may be varied to create projections which vary in thickness along their length. As best shown in FIGS. 4A through 4D, the thickness of the projection 22 increases as the projection extends upwardly and radially outwardly.

As best shown in FIG. 5A, the closure 10 of the present invention is shown disposed within the mold cavity 54 and is comprised of the elements mentioned earlier, i.e., a top wall 16, an annular sidewall 18, a tamper-indicating ring 14 and a plurality of projections 22. The movable male mold portion 56 further includes a central bore that has two open ends and that is substantially axially aligned with the longitudinal axis of the apparatus 50. This bore receives a knock-out bar 70 that slidably engages the inner surface of the bore. In the mold closed position, the outer surface of the movable male mold portion 56 is maintained at a predetermined distance from the inner surface of the annular recess 59 of the female mold portion 58 so that the space between the outer surface of the movable male mold portion 56 and the surface of the annular recess 59 of the female mold portion 58 forms a large portion of the mold cavity 54.

In the mold closed position of the apparatus 50, the top surface 76 of knock-out bar 70 is aligned to be at the same height as the top surface 74 of the movable male mold portion 56. When the molding material, usually molten plastic, is injected into the mold cavity 54 from the injection port 52, the top surface 74 of the movable male mold portion 56, in cooperation with the top surface 76 of the knock-out bar 70, forms the top wall 16 of the closure 10.

As stated before, movable male mold portion 56 includes an axially aligned bore having two open ends for receiving the knock-out bar 70. In order to form the closure 10, the apparatus is set to the mold closed position. Molding material is then introduced into mold cavity 54 by the injection port 52. When the molding material has hardened sufficiently, a closure 10 having an internally threaded cap portion 12, a cylindrical tamper-indicating ring 14, and a plurality of projections 22 extending radially inward and upward from the tamper-indicating ring 14 is formed. As illustrated in FIG. 5A, the projections 22 extend in their final molded position radially inward and upward from the tamper-indicating ring 14. FIGS. 6 through 8 and FIGS. 6A through 8A illustrate the various operations that the apparatus 50 performs in order to eject the formed closure 10 from the mold cavity 54 while preserving the desired molded configuration of the projections as shown in FIG. 4A.

Figure 6:
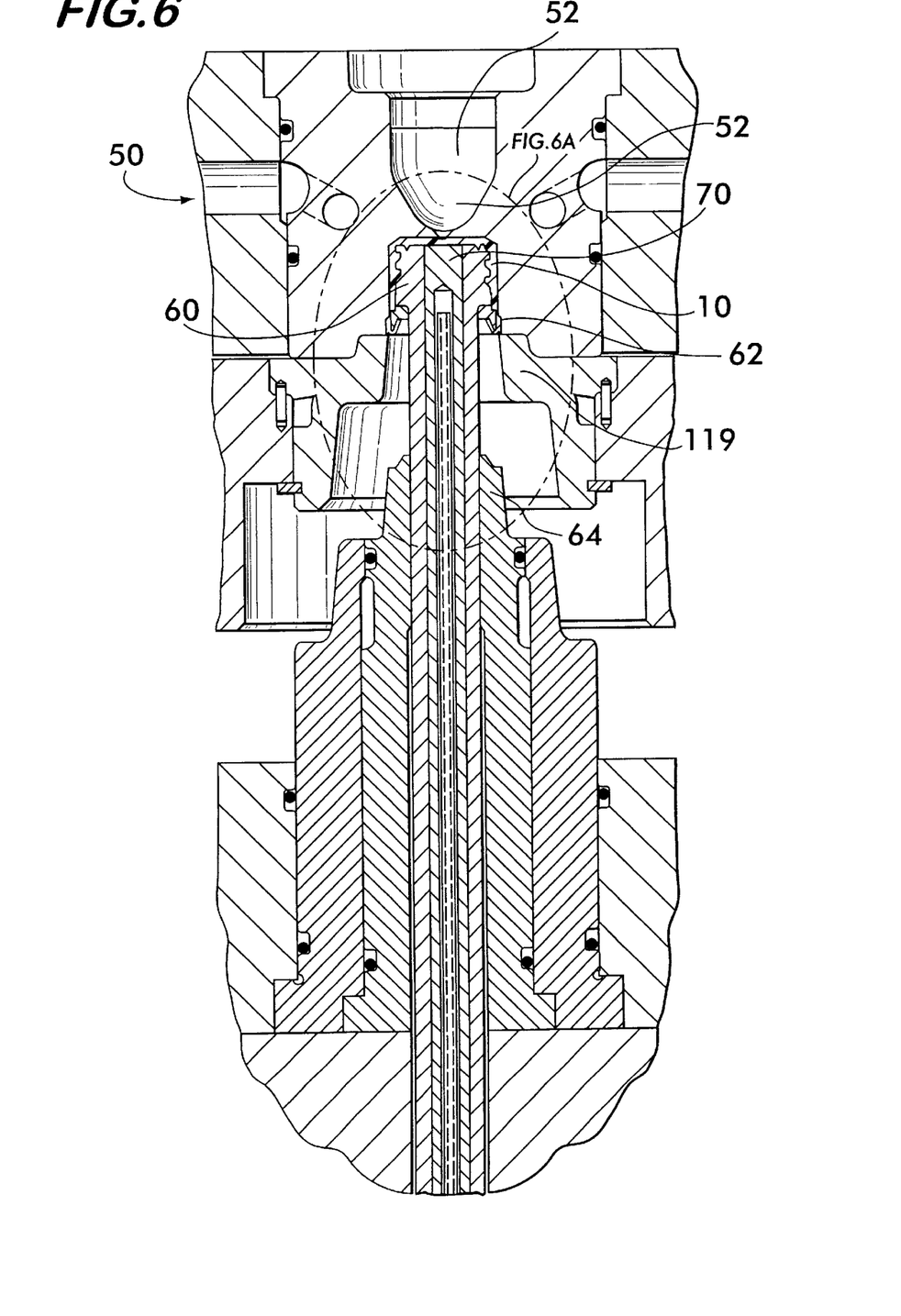
FIG. 6 is a cross-sectional view illustrating a second movement of the molding apparatus of the present invention wherein the outer core member is separated from the bottom surfaces of the projections of the inventive tamper-indicating closure.
Figure 6A:
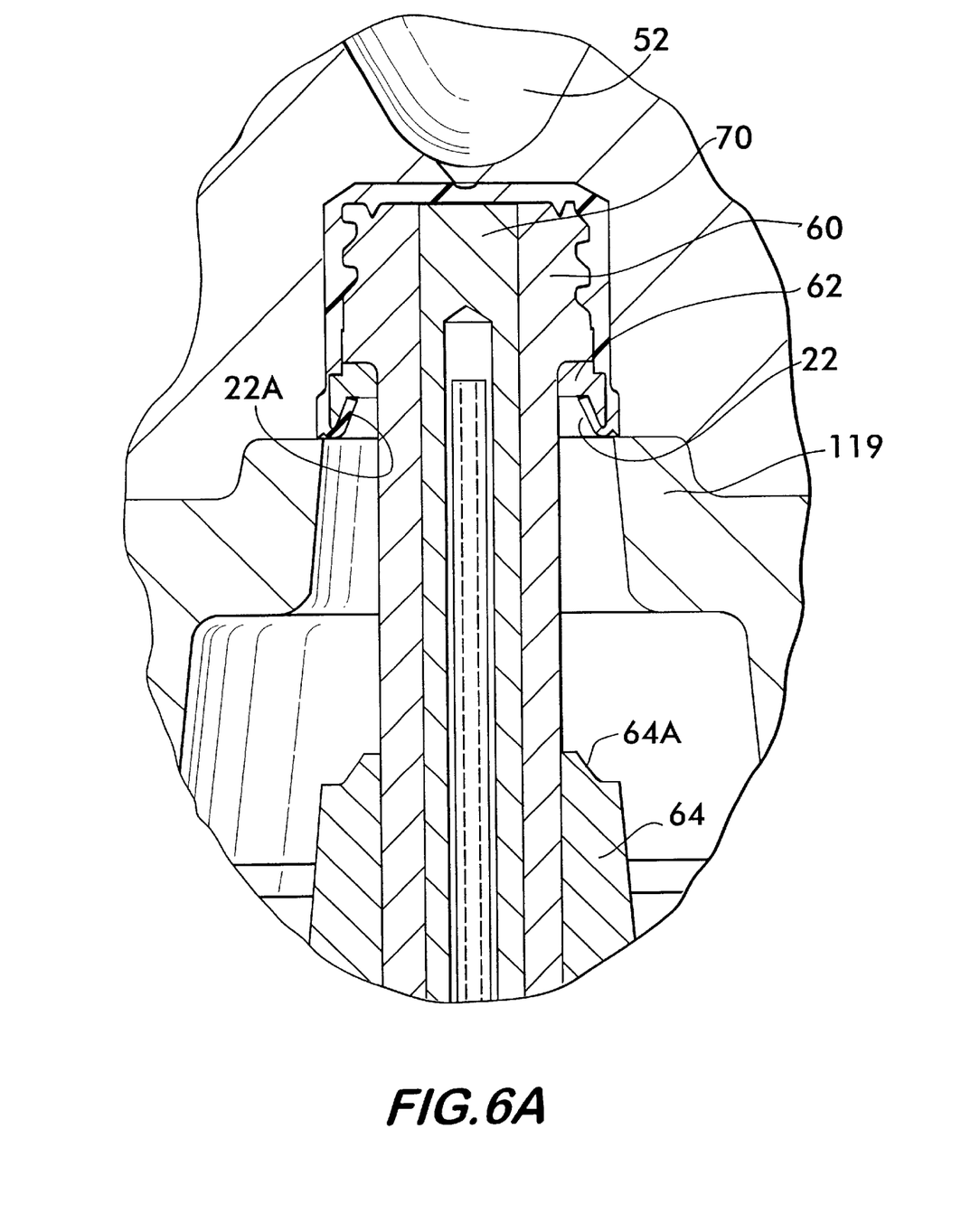
FIG. 6A is a detailed view of the area circled and labeled "FIG. 6A" in FIG. 6.

Referring now to FIGS. 6 and 6A, after the closure 10 has solidified but not necessarily cooled completely, the outer core member 64 is moved away from the remaining components of the moveable male mold portion 56. That is, the outer core member 64 is moved away from the skirt member 62 and the inner core member 60. This operation exposes the lower wall 22a (best shown in FIG. 6A) of each of the projections 22.

Figure 7:
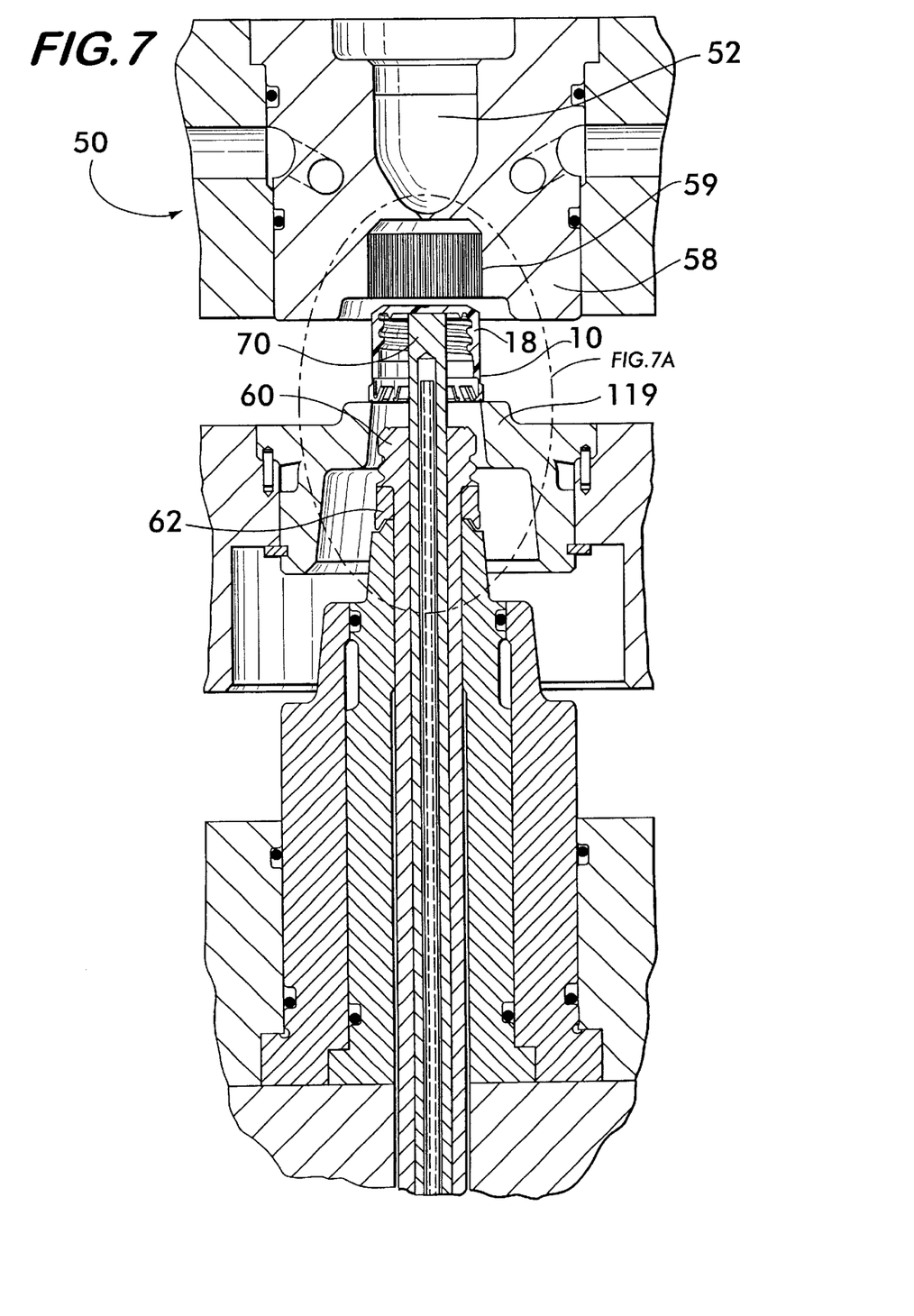
FIG. 7 is a cross-sectional view illustrating a third movement of the molding apparatus of the present invention wherein the female portion of the mold cavity is removed from the outer surface of the inventive tamper-indicating closure and the inner core member and skirt member are removed from within the tamper-indicating closure.
Figure 7A:
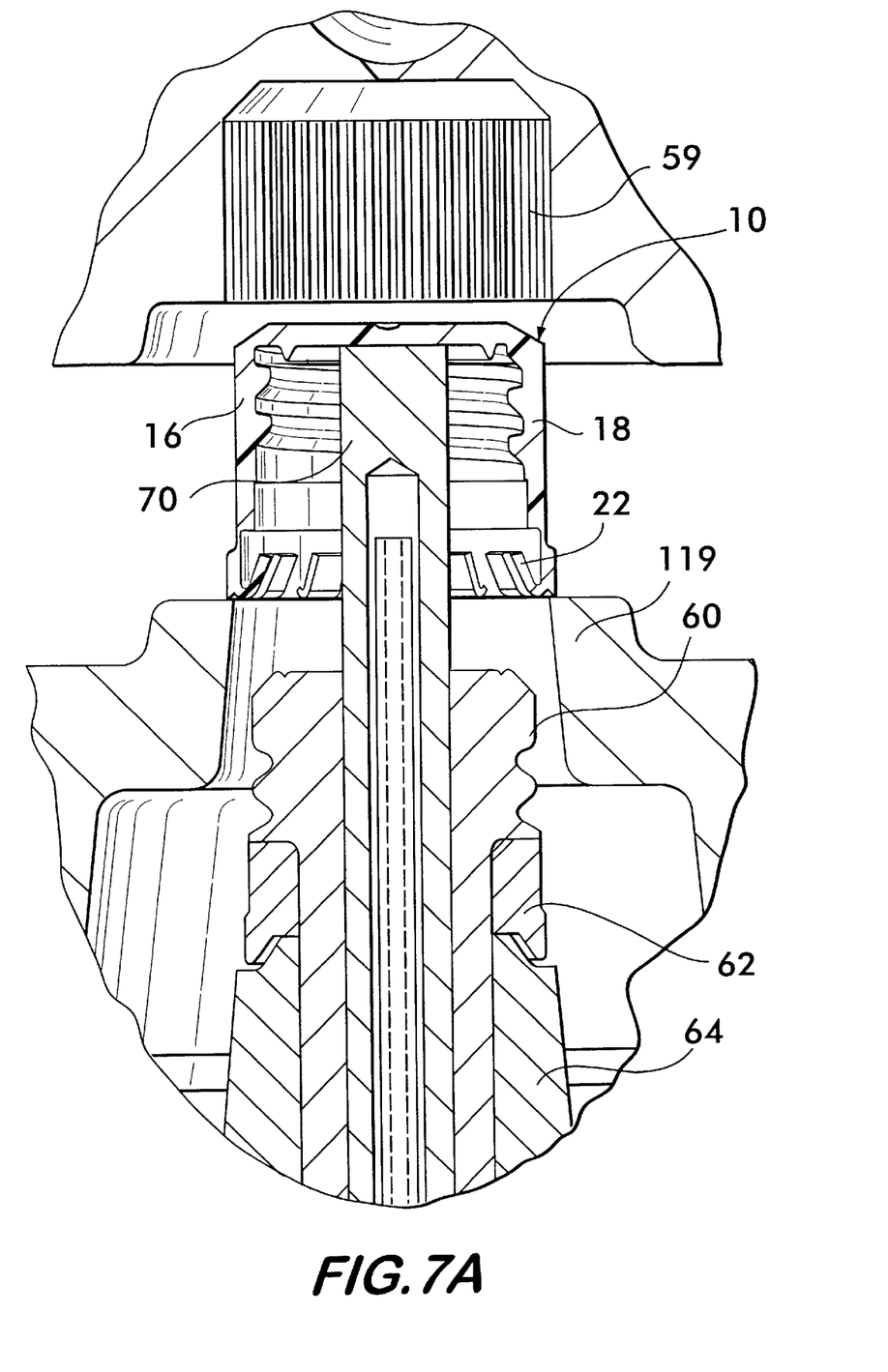
FIG. 7A is a detailed view of the area circled and labeled "FIG. 7A" in FIG. 7.

Next, as shown in FIGS. 7 and 7A, the female mold portion 58 is lifted away from the closure 10. Thus, the annular recess 59 is lifted to expose the outside surfaces of the top wall 16 and annular sidewall 18 of the closure 10. With the female mold portion 58 lifted away, the next step in the process is to unscrew the inner core member 60 and skirt member 62 from within the closure 10. FIGS. 7 and 7A illustrate the inner core member 60 and the skirt member 62 after they have been unscrewed and withdrawn vertically downwardly from within the closure 10. A stripper ring 119, having a plurality of upwardly extending of fingers (not shown), surrounds the tamper-indicating ring 14 of the closure 10. The plurality of upwardly standing metal fingers (not shown) disposed on the stripper ring 119 extend into pockets 27 located between the projections (best shown in FIG. 3) on the closure. Because the upwardly projecting fingers (not shown) extend into the pockets 27, the stripper ring 119 remains affixed to the closure 10 and prevents rotational movement of the closure 10 during the unscrewing of the inner core member 60 and skirt member 62.

During removal, the inner core member 60 and the skirt member 62 are rotated and moved downwardly along the longitudinal axis of the apparatus 50. Since the stripper ring 119 ensures that the closure 10 remains non-rotational, rotation of the inner core member 60 and skirt member 62 causes these members to be unscrewed from the closure 10. As the inner core member 60 and skirt member 62 move away from the closure 10, the vertical sidewalls of the inner core member 60 and skirt member 62 urge the projections 22 to temporarily point downwardly in an alignment substantially parallel to the longitudinal axis of the apparatus 50. This progressive movement of the projections 22 from their position as molded to pointing vertically downwardly during removal of the inner core member 60 and skirt member 62 is best illustrated in FIGS. 4A through 4D.

FIG. 4A illustrates a projection 22, as molded, extending radially inwardly and upwardly from the tamper-indicating ring 14 at a predetermined angle of inclination, that angle being indicated at 15 and at a predetermined radius of curvature. The predetermined angle of inclination, indicated at 15, is measured from the vertical inside wall of the ring 14 and is any suitable angle, e.g., between 20° and 75°. So long as the projection 22 does not extend below the bottom horizontal plane 19 of the closure 10, after removal of the male mold portion 56, the closure 10 is acceptable for use. However, the angle of inclination illustrated in FIG. 4A is preferable. The radius of curvature 23 may be any suitable dimension, e.g., 0.030 inches where the overall diameter of the closure is approximately 0.870 inches. As the overall diameter of the closure 10 increases, the radius of curvature 23 may be increased. As explained previously, the projections 22 should point radially upward as well as inward so that the projections can be urged against the lower surface of the annular shoulder of the container when the cap portion is unscrewed from the container. As shown in FIGS. 4A through 4D, the projections 22 may also increase in thickness as they extend from their radius of curvature 23 upwardly and inwardly to occupy more space beneath the lip of the bottle. At the bottom of the radius of curvature 23, the projection may be of any suitable thickness that provides sufficient strength, flexibility and recoilability, e.g., a thickness between about 0.018 and about 0.019 inches. As opposed to a sharp bend, the radius of curvature 23 is provided to enable the projections 22 to roll out in a gradual manner during removal of the inner core member 60 and the skirt member 62 to minimize the occurrence of any plastic deformation.

Figure 4B:
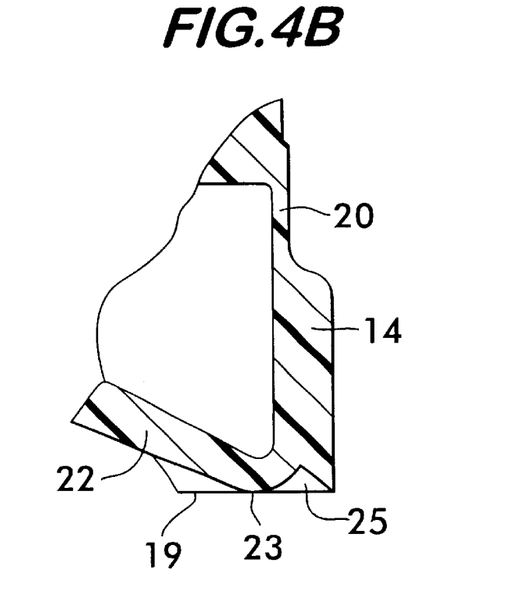
FIGS. 4B through 4D are three sectional views of a projection of the tamper-indicating closure, the projection being deflected progressively downwardly from its molded position to a vertical downward orientation (illustrated in FIG. 4D) during removal of the male mold portion.
Figure 4C:
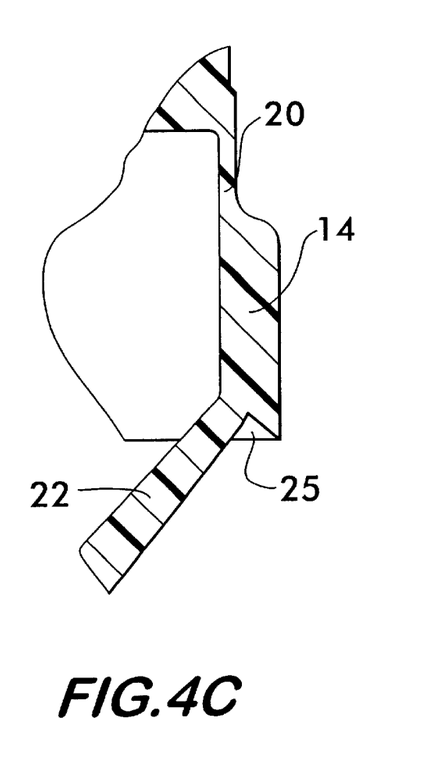
Figure 4D:
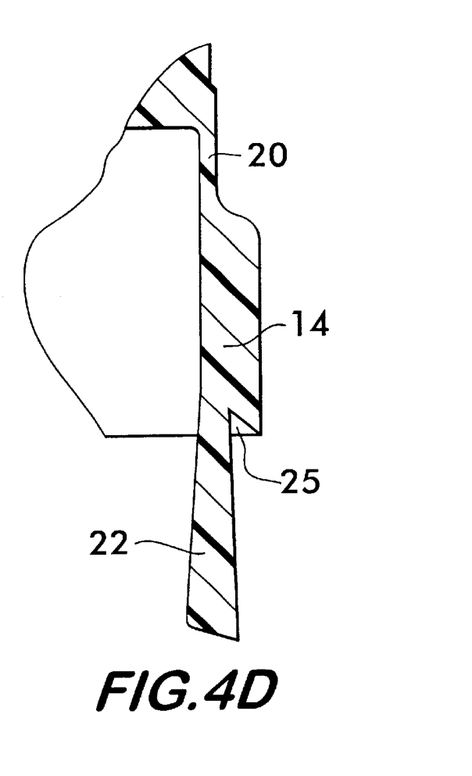

The tamper-indicating ring 14 is also provided with a strain relief recess 25 which acts to reduce plastic deformation of each projection 22 as each is temporarily bent downwardly from its molded orientation through the increasing amounts of deflection as illustrated in FIGS. 4B, 4C and 4D during removal of the inner core member 60 and skirt member 62. The strain relief recess 25 may be of any suitable dimensions. As shown in FIG. 4A, the strain relief recess 25 includes an apex 29. The recess 25 should be formed in any manner such that the thickness of material at the bottom of the radius of curvature 23 is maintained constant as the curvature extends from the bottom of the radius of curvature 23 to the apex 29. By maintaining the thickness in this area, compression of material is avoided to minimize plastic deformation and substantially reduce the possibility of breakage of the projections during removal of the inner core member 60 and skirt member 62.

FIGS. 4B, 4C and 4D illustrate the manner in which each projection 22 is temporarily bent downwardly from its molded orientation as the inner core member 60 and skirt member 62 are moved further downwardly along the longitudinal axis of the apparatus 50 from within the closure 10. In FIG. 4B, the inner core member 60 and skirt member 62 have only been moved downwardly from within the closure 10 by a small amount. Thus, the projection 22 has begun to bend by only a small amount. This amount of downward deflection is within the elastic limit of the projection 22 and does not result in the projection 22 being plastically deformed in a manner that would prevent it from bending back to its "as molded" position. That is, if the extent of bending of the projections 22 were as shown in FIG. 4B, upon removal of the bending force, the projection 22 would return fully to its "as molded" position as shown in FIG. 4A. Referring now to FIG. 4C, as the inner core member 60 and skirt member 62 are removed further downwardly from the closure 10, the projection 22 is bent an even greater amount to a point which represents the elastic limit of the projection 22. In other words, if the projection 22 were bent only to the point as shown in FIG. 4C, upon removal of the bending force, the projection 22 would bend back fully to its "as molded" orientation as shown in FIG. 4A because the projection 22 has not lost any of its resiliency due to plastic deformation. Further bending beyond the elastic limit (FIG. 4C) causes the projection 22 to undergo plastic deformation, as shown in FIG. 4D. As shown in FIG. 4D, upon removal from the closure 10, the sidewalls of the inner core member 60 and skirt member 62 cause the projections 22 to be bent to a position where they are in vertical alignment with the longitudinal axis of the apparatus 50. In this position, the projections 22 undergo some degree of plastic deformation. However, as explained below, the provision of the strain relief recess 25 enables each projection 22 to retain substantially all of its resiliency so that after removal of the inner core member 60 and skirt member 62, the projections 22 bends back to substantially its "as molded" position.

The strain relief recess 25 provides an area into which the thermoplastic material of the projection 22 can flow during deflection to minimize plastic deformation. A comparison of the size and shape of the strain relief recess 25 as illustrated in FIGS. 4B, 4C and 4D reveals that as the projection 22 is bent further downwardly, its associated strain relief recess 25 grows smaller. The ability of the strain relief recess 25 to take up thermoplastic material as the projection 22 is bent reduces compression of thermoplastic material in the area of the radius of curvature 23 and enables the projection 22 to be bent further before the occurrence of plastic deformation. In this manner, the amount of plastic deformation resulting from bending the projection 22 to the position shown in FIG. 4D is minimized, thus enabling the projection to return substantially to its original "as molded" position as shown in FIG. 4A although the inclination of the projection 22 may differ to a nominal extent due to plastic deformation. Under the prior art methods discussed above that do not provide either a radius of curvature 23 or a strain relief recess 25, or both, the performance of one or more secondary operations would be necessary to heat and/or physically urge the downwardly bent projections from their position as shown in FIG. 4D to their "as molded" position as shown in FIG. 4A.

Figure 8:
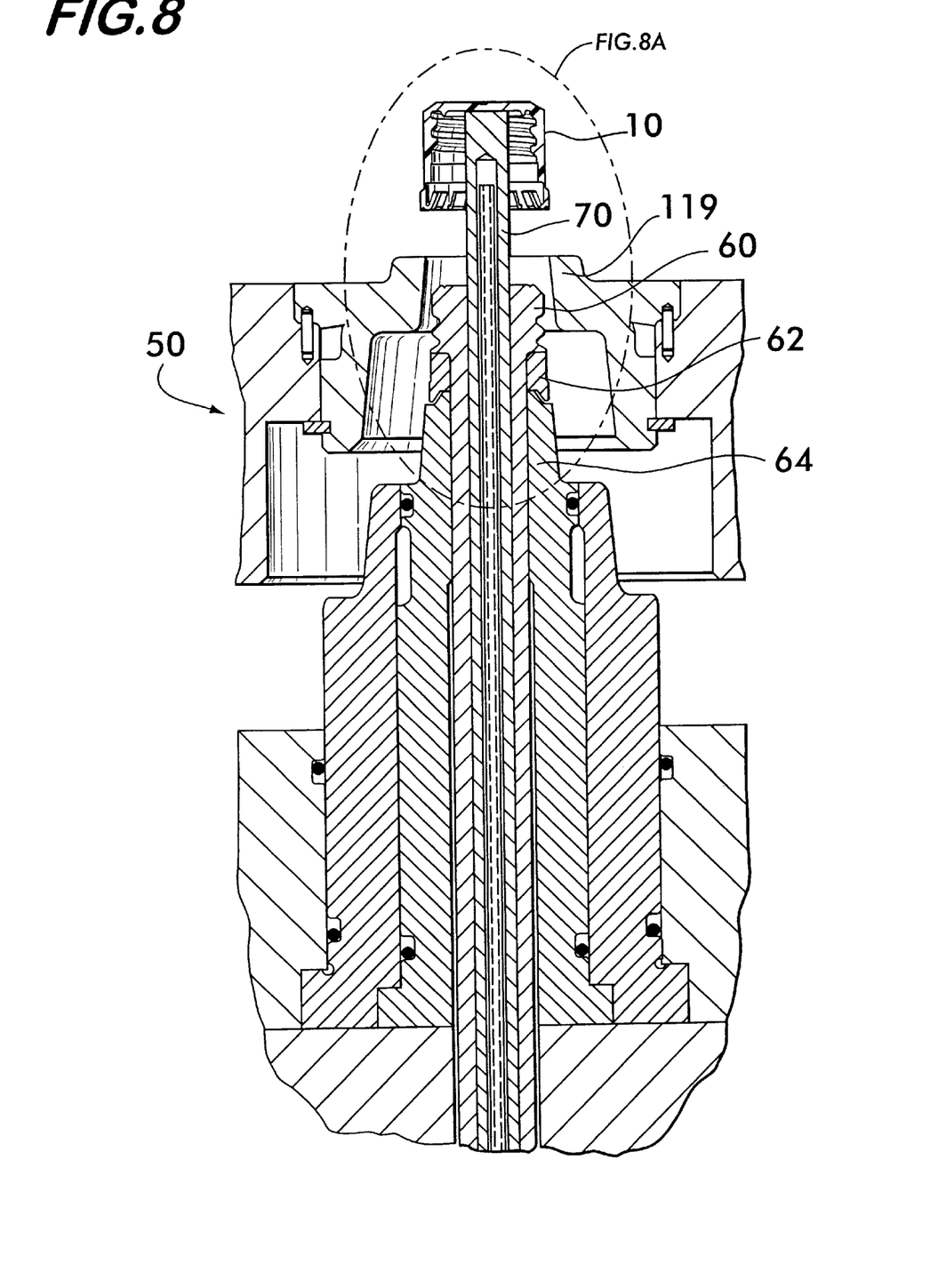
FIG. 8 is a cross-sectional view illustrating a fourth movement of the molding apparatus of the present invention wherein a knock-out bar moves upwardly to eject the tamper-indicating closure from the stripper ring; and, FIG. 8A is a detailed view of the area circled and labeled "FIG. 8A" in FIG. 8.
Figure 8A:
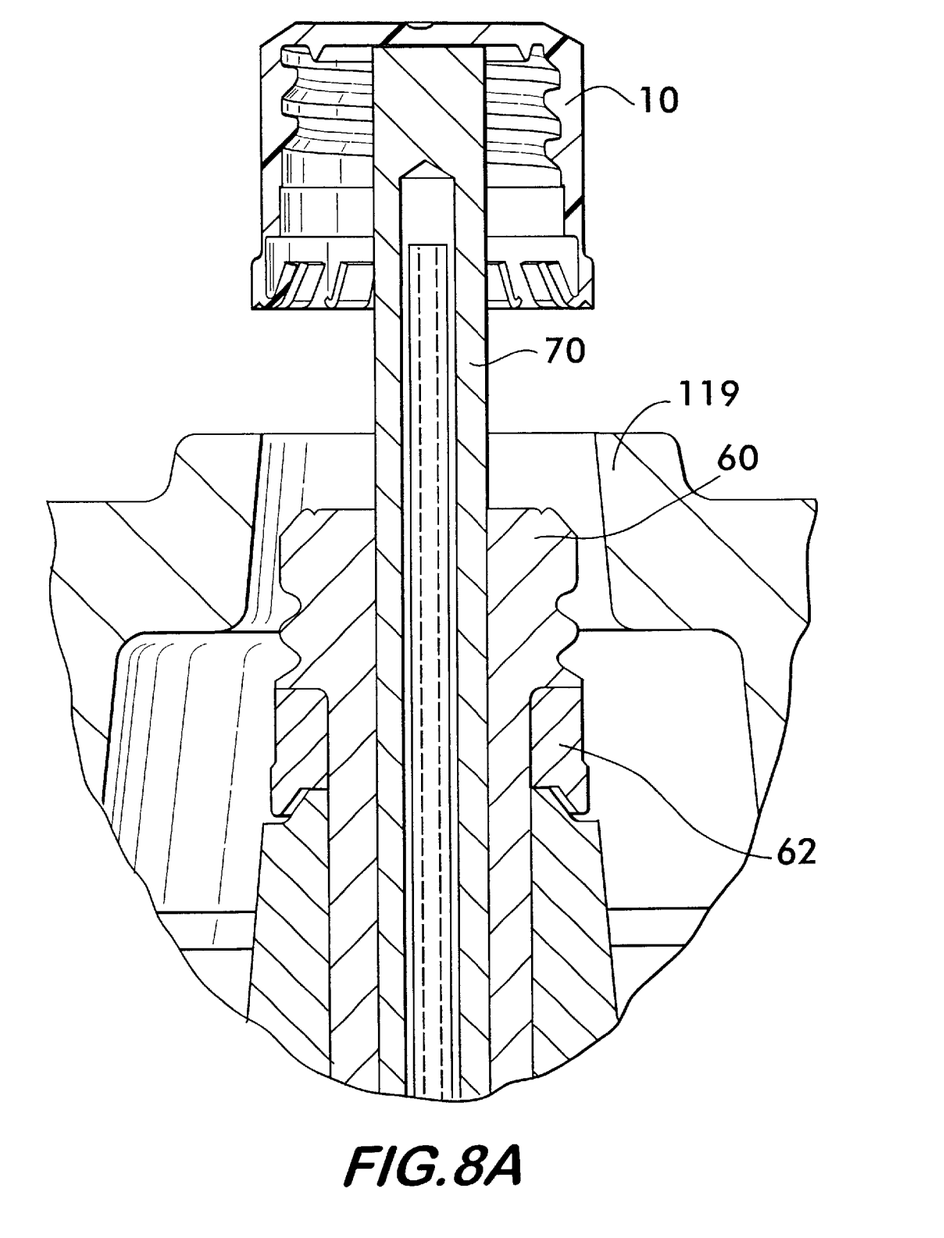

Referring now to FIGS. 8 and 8A, under the final step, the knock-out bar 70 is moved through the bore of the moveable male mold portion 56 to eject the closure 10 out of the stripper ring 119. With the closure 10 ejected and conveyed out of the apparatus 50 to a receiving bin, the apparatus moves back to the closed position as illustrated in FIGS. 5 and 5A to repeat the process detailed above. Thus, the present invention enables the manufacture of a closure 10 having projections 22 that extend radially inward and upward from a tamper-indicating ring 14 of the closure 10 without relying on any secondary steps necessary to bend and set the projections into the desired configuration.

Those skilled in the art will understand that there are many modifications which may be made to the disclosed embodiments without departing from the teachings of the invention and these modifications are considered to be within the scope of this invention which is intended to be limited only by the claims appended hereto.

I claim:

1. A tamper-indicating closure having a plurality of resilient flexible projections, said closure being formed within a mold assembly comprising a male mold portion and a female mold portion, the male mold portion initially being disposed within said closure for forming the inner surface of said closure, the female mold portion constructed to form the outer surface of said closure, the male mold portion being removed from within said closure during a subsequent molding step, said closure comprising:

a. a cap portion;

b. a tamper-indicating ring depending from said cap portion, c. a plurality of separate resilient flexible projections depending from a lower region of said ring, said separate projections bending upwardly and radially inwardly at a predetermined radius of curvature from said ring, said separate projections each being moveable around a respective horizontal axis;

d. each of said separate projections having a corresponding separate downward-motion deformation-limiting strain relief recess formed in said ring, each separate downward-motion deformation-limiting strain relief recess being disposed radially outwardly from its corresponding separate projection of plurality of separate projections to limit the extent of plastic deformation of said separate projections when a downward-motion producing force is applied to said projections and said projections are bent downwardly around their horizontal axis from their predetermined radius of curvature to a second position during removal of the male mold portion from within the tamper-indicating closure during the subsequent molding step, said separate downward-motion deformation-limiting strain relief recesses enabling their corresponding separate projections to elastically return to substantially their predetermined radius of curvature.

2. The tamper-indicating closure of claim 1 wherein said radius of curvature is approximately 0.030 inches.

3. The tamper-indicating closure of claim 1 wherein the thickness of each said projection is between about 0.018 and about 0.019 inches.

4. The tamper-indicating closure of claim 1 wherein said plurality of resilient flexible projections comprises three or more resilient flexible projections is located at an equal circumferential interval about said ring.

5. The tamper-indicating closure of claim 1 wherein said plurality of resilient flexible projections are disposed at an angle of inclination of approximately 20°.

6. The tamper-indicating closure of claim 1 wherein said plurality of resilient flexible projections are disposed at an angle of inclination of between about 20° and 70°.

* * * * *